(12) United States Patent
Toko et al.

(10) Patent No.: US 10,738,958 B2
(45) Date of Patent: Aug. 11, 2020

(54) LIGHTING DEVICE

(71) Applicant: STANLEY ELECTRIC CO., LTD., Tokyo (JP)

(72) Inventors: Yasuo Toko, Yokohama (JP);
Yoshifumi Takao, Yokohama (JP);
Takashi Sugiyama, Yokohama (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/231,350

(22) Filed: Dec. 21, 2018

(65) Prior Publication Data

US 2019/0195457 A1  Jun. 27, 2019

(30) Foreign Application Priority Data

Dec. 21, 2017  (JP) ................. 2017-245336

(51) Int. Cl.
| | |
|---|---|
| *F21S 41/64* | (2018.01) |
| *F21S 41/135* | (2018.01) |
| *F21S 41/25* | (2018.01) |
| *F21S 41/141* | (2018.01) |
| *F21S 41/176* | (2018.01) |

(Continued)

(52) U.S. Cl.
CPC .......... *F21S 41/645* (2018.01); *B60Q 1/1423* (2013.01); *F21S 41/135* (2018.01); *F21S 41/141* (2018.01); *F21S 41/176* (2018.01); *F21S 41/25* (2018.01); *H05B 47/105* (2020.01); *B60Q 2300/056* (2013.01); *B60Q 2300/42* (2013.01); *F21S 41/64* (2018.01); *F21Y 2115/10* (2016.08)

(58) Field of Classification Search
None
See application file for complete search history.

(56) References Cited

U.S. PATENT DOCUMENTS

| | | | |
|---|---|---|---|
| 2014/0175978 A1 | 6/2014 | Kobayashi | |
| 2017/0276980 A1 | 9/2017 | Kauschke et al. | |
| 2019/0078749 A1 | 3/2019 | Toko et al. | |

FOREIGN PATENT DOCUMENTS

| | | |
|---|---|---|
| DE | 10 2013 113 807 A1 | 6/2015 |
| EP | 3 457 025 A1 | 3/2019 |

(Continued)

OTHER PUBLICATIONS

Extended European Search Report for the related European Patent Application No. 18214690.2 dated May 9, 2019.

*Primary Examiner* — Britt D Hanley
(74) *Attorney, Agent, or Firm* — Kenealy Vaidya LLP (57) ABSTRACT

A lighting device comprising: a light source for emitting lights along optic axis toward field of view; a liquid crystal element disposed on the optic axis, having electrode pattern in far field FF corresponding region and having no electrode pattern in near field corresponding region; a pair of polarizers including input side and output side polarizers sandwiching the liquid crystal element, constituting crossed Nicol polarizers; driver circuit for forming voltages applied to the electrode pattern; and phase shift forming element disposed between the pair of polarizers in the near field corresponding region of the liquid crystal element; wherein the far field corresponding region constitutes normally black optic system together with the pair of polarizers, and the near field corresponding region constitutes normally-on optic system together with the phase shift forming element and the pair of polarizers.

11 Claims, 5 Drawing Sheets

(51) Int. Cl.
*B60Q 1/14* (2006.01)
*H05B 47/105* (2020.01)
*F21Y 115/10* (2016.01)

(56) References Cited

FOREIGN PATENT DOCUMENTS

| | | | |
|---|---|---|---|
| JP | 2005-183327 | A | 7/2005 |
| JP | 2013-054849 | A | 3/2013 |

LIGHTING DEVICE

CROSS REFERENCE TO RELATED APPLICATION

This application is based on and claims the benefit of priority from Japanese Patent Application No. 2017-245336, the entire content of which is incorporated herein by reference.

BACKGROUND OF THE INVENTION

Field

This invention relates to a lighting device adapted for use as a car headlight.

Related Art

In recent car headlights, technique of real-time controlling light distribution pattern depending on the front circumstances such as existence of an upcoming car, referred to as adaptive driving beam (ADB), has attracted attention. According to ADB, when a car is driven with driving light distribution, i.e. high beam which illuminates both near field and far field, and an upcoming car is detected in the opposite lane, it is possible to reduce lights directed to only the area of the upcoming car among areas illuminated by the headlight. The driver of the running car is given field of view close to the high beam, whereas the driver of the upcoming car can be prevented from receiving glare.

It can be considered to form a headlight of variable light distribution pattern as described above by utilizing matrix type light source in which a plurality of light emitting diodes (LEDs) are disposed in matrix configuration, and drive currents of the respective LEDs are controlled by driver circuit, and projecting output lights of controlled distribution shape forward through projecting optical element such as projection lens. However, a plurality of current sources will be necessary for arbitrarily controlling drive currents for the plurality of LEDs, and hence the manufacturing cost of the headlight will become high.

Such concept as disposing selective light shielding member such as a liquid crystal device including a liquid crystal element equipped with front side and rear side polarizers in the output optical path of a light source such as an LED lamp, and pattern-controlling the output lights of the light source by the selective light shielding member has been proposed (for example JPA 2005-183327). The light source is only required to illuminate field of view, and the number of required LEDs can be limited. The selective light shielding member for controlling the entire light distribution pattern can be realized by one liquid crystal device. Liquid crystal device having a plurality of control regions capable of controlling the respective light transmissions of the control regions can be obtained at very low prices. It becomes possible to reduce the manufacturing cost of the headlight remarkably.

In case of giving light distribution pattern to output light emitted from a light source by using liquid crystal device, electrodes are disposed on both sides of a liquid crystal layer in the liquid crystal element to apply voltage to the liquid crystal layer to control the orientation of the liquid crystal molecules, and a pair of polarizers (polarizer and analyzer) are disposed in front of and at the rear of the liquid crystal element, thereby controlling the transmissivity of the input light by the orientation of the liquid crystal molecules based on ON/OFF of the voltage applied to the liquid crystal layer. Control for adjusting light transmissivity including the case of binary-controlling the light transmissivity among 0 and 1 may be called transmittance adjusting control. Combination of a liquid crystal element and a pair of polarizers may collectively called a liquid crystal device.

In order to real-time control light distribution pattern from a headlight depending on the front circumstances such as existence of an upcoming car, front monitoring system connected with various sensors such as on-vehicle camera, radar, vehicle speed sensor, etc. is used (for example JPA 2013-054849). Information of image data supplied from the sensors is processed to detect front vehicles (upcoming car, foregoing car) etc. and to output data necessary for controlling the light distribution pattern. Light distribution control system determines light distribution pattern based on information supplied from the front monitoring system.

Those liquid crystal devices which become light transparent in no applied voltage state are called normally white type, and those liquid crystal devices which become light shielding in no applied voltage state are called normally black type. For example, a liquid crystal device including a twisted nematic (TN) liquid crystal element sandwiched between crossed Nicol polarizers can constitute a normally white type liquid crystal device and liquid crystal device including twisted nematic liquid crystal element sandwiched between parallel Nicol polarizers can constitute a normally black type liquid crystal device. It may be difficult to realize a TN liquid crystal device having a high contrast ratio. Liquid crystal device employing a vertically aligned liquid crystal element and crossed Nicol polarizers and liquid crystal device employing an in-plane switching (IPS) liquid crystal element and crossed Nicol polarizers can constitute normally black type liquid crystal devices and can exhibit illumination function of high contrast ratio. For forming a headlight of high contrast ratio and high performance, normally black type liquid crystal device is adapted.

In case of forming light shielding portion of ADB lighting device by liquid crystal device, it is necessary to prepare countermeasure for accidental situation in which the liquid crystal device becomes unable to work. When a normally white type liquid crystal device in an ADB lighting device becomes off (no driving voltage), the total lighting plane becomes transparent and high beam is irradiated to upcoming cars to give glare to the upcoming cars. Even in an urgent case, this is unfavorable. When a normally black type liquid crystal device in an ADB lighting device becomes off (no driving voltage), the total lighting plane becomes light shielding to make the total field of view black. This is extremely unfavorable for maintaining fail-safe security. Some countermeasure should be taken for maintaining minimum level lighting.

SUMMARY

In far field region, it is necessary to partially control transmittance of light distribution pattern. Transmittance control of light distribution pattern can be done by forming electrode pair patterns sandwiching a liquid crystal layer in respective regions, enabling selective voltage application, and disposing so-manufactured liquid crystal structure between a pair of polarizers. The near field region is the region which should be always illuminated, and it is unnecessary to achieve partial transmittance adjusting control of light distribution pattern.

A lighting device including a liquid crystal device capable of performing ADB and proving fail-safe security countermeasure upon failure of the liquid crystal device is desired. As fail-safe security countermeasure, it is desired to project near field illumination.

Fail-safe security countermeasure can be provided by lighting far field region in normally black mode and lighting near field region in normally-on mode.

According to an embodiment of this invention, there is provided a lighting device comprising:

a light source for emitting illumination lights along an optic axis toward field of view including far field region at upper part and near field region at lower part with respect to vertical direction;

a liquid crystal element disposed at a position along the optic axis, having electrode pattern in far field corresponding region corresponding to the far field region and having no electrode pattern in near field corresponding region corresponding to the near field region;

a pair of polarizers including an input side polarizer disposed on light source side of the liquid crystal element, and an output polarizer disposed on field of view side of the liquid crystal element, and constituting crossed Nicol polarizers;

driver circuit for forming voltages to be applied to the electrode pattern; and phase shift forming element disposed between the pair of polarizers in correspondence to the near field corresponding region of the liquid crystal element;

wherein the far field corresponding region of the liquid crystal element constitutes normally black optic system together with the pair of polarizers, and the near field corresponding region of the liquid crystal element constitutes normally-on optic system together with the phase shift forming element and the pair of polarizers.

In always illuminating region, electrode pattern is unnecessary. Liquid crystal region having no electrode and disposed between crossed Nicol polarizers form light shielding region. When a phase shift forming element is disposed in this region to shift the phase of the incident light, it can constitute light transmittance region. Lighting for maintaining fail-safe security can be provided by forming normally-on mode illuminating region in near field region.

Reference Symbols: 1 light source, 2 power source, 3 liquid crystal element, 4 (4-1, 4-2) transparent substrates, 5 liquid crystal layer, 6 electrode pattern,

7 (near field) swivel light distributing electrode, 8 no-electrode region,

9 phase shift plate, 10 projecting optical system, 11 lighting device,

12 drive circuit, 13 light distribution control unit, 21 reflector, 25 control circuit, P polarizer (P1, P2), FF far field of view, NF near field of view.

DESCRIPTION OF THE PREFERRED EMBODIMENTS

Figure 1A:
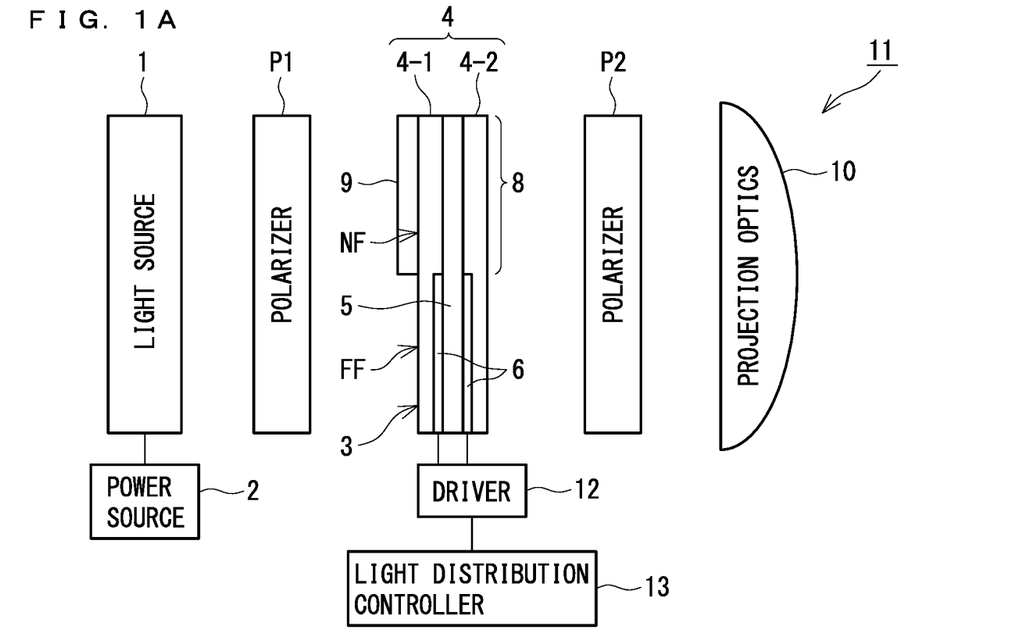
FIG. 1A is a block diagram illustrating a lighting device according to first embodiment of this invention.

Referring to FIG. 1A, a lighting device according to first embodiment will be described. Description will be made on a case where a lighting device is a car headlight. In FIG. 1A, a light source 1 is a white light emitting body, for example, constituted from a plurality of light emitting diode chips and a fluorescence film disposed on the light emitting diode chips, to be driven by a power source 2 to emit lights and supply white lights to a liquid crystal element 3. The liquid crystal element 3 has such a structure that a liquid crystal layer 5 is sandwiched between transparent substrates 4 (4-1, 4-2) and electrode pattern 6 is formed in a far field of view FF corresponding region at lower part in the figure. The electrode pattern 6 includes a widely distributed common electrode and a multiplicity of segment electrodes constituting display/illumination areas mutually opposed and sandwiching the liquid crystal layer 5. In the figure, a near field of view NF corresponding region includes no-electrode region 8 where the electrode pattern 6 is not formed. The liquid crystal element 3 is constituted of, for example, a vertically aligned liquid crystal element, or an in-plane switching liquid crystal element. Input and output polarizers P1 and P2 constitute crossed Nicol polarizers.

The electrode pattern 6 is driven by driver circuit 12 which supplies driving signal based on light distribution control information supplied from light distribution control unit 13. The liquid crystal layer 5 provided with the electrode pattern 6 sandwiched between the crossed Nicol polarizers constitutes normally black type liquid crystal element. The upper region (in the figure) of the liquid crystal layer 5 which is provided with no electrode pattern 6, as itself, constitutes an optic element which is shielded by the crossed Nicol polarizers P1 and P2. A $\lambda/2$ phase shift plate (wavelength plate) 9 is disposed in close contact with the liquid crystal element 3, and is pasted on one of the substrates 4, overlapping the near field region NF corresponding region of the liquid crystal element 3.

Figure 1B:
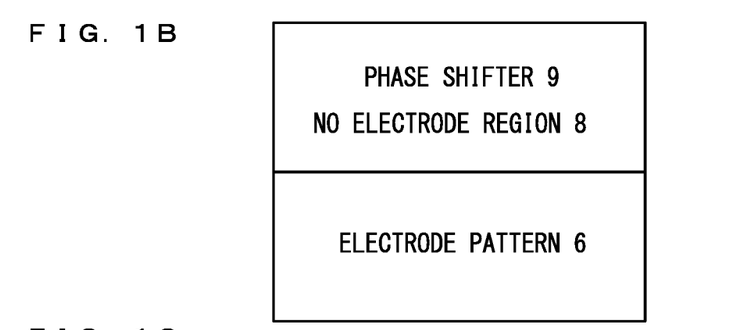
FIG. 1B is a plan view schematically illustrating arrangement of a phase shift plate overlapping a liquid crystal element.

As is illustrated in FIG. 1B, the phase shift plate 9 is disposed to overlap the no-electrode region 8. This region has no electrode and hence has no function of modifying the liquid crystal layer by electric field and changing the polarization axis, but the phase shift given by the phase shift plate 9 changes the phase of the incident light in one axial direction, and as a result, the polarization direction of the incident light changes to transmit the downstream polarizer P2 (analyzer). Thus, normally-on (always-on) transparent region appears.

Figure 1C:
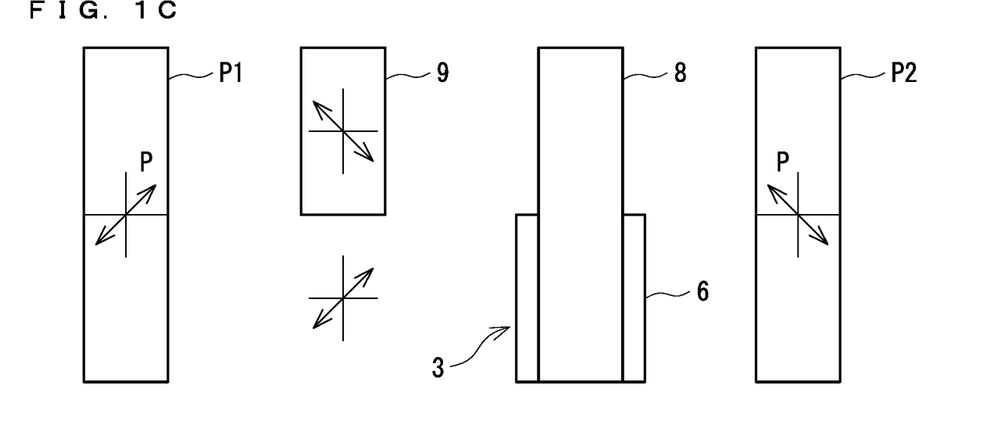
FIG. 1C is a diagram illustrating changes in polarization of light transmitting through an input polarizer P1, a phase shift plate 9, a liquid crystal element 3 having electrode pattern 6 and no-electrode region 8, and an output polarizer (analyzer) P2.

FIG. 1C illustrates polarization states of lights transmitting through the polarizer P1, the phase shift plate 9, the liquid crystal element 3 having the electrode pattern 6 and the no-electrode region 8, and the polarizer P2. For example, it is assumed that from non-polarized incident light beam the polarizer P1 forms a linearly polarized light at an angle which is 45 degrees relative to x and y axes. The phase shift plate 9 gives to x axis component of the transmitting light a phase shift of λ/2 (half wavelength), hence constitutes polarization having polarization rotated by 90 degrees, and supplies it to the near field region NF (no-electrode region 8) of the liquid crystal element 3. The no-electrode region 8 is applied with no voltage, and transmits the incident light which then transmits the polarizer P2.

The far field region FF of the liquid crystal element 3, which is not provided with the phase shift plate 9, has the electrode pattern 6. When the incident polarization is injected to the far field region FF of the liquid crystal element not applied with the voltage and is transmitted, it will be shielded by the polarizer P2 forming crossed Nicol polarizers with the polarizer P1. When voltage is applied to the electrode pattern 6 to change the orientation of the liquid crystal element, for example the polarization angle is rotated by 90 degrees, the transmitted light transmits the polarizer P2. When the voltage applied to the electrode 6 vanishes, transmission light through the far field region FF vanishes.

Figure 2:
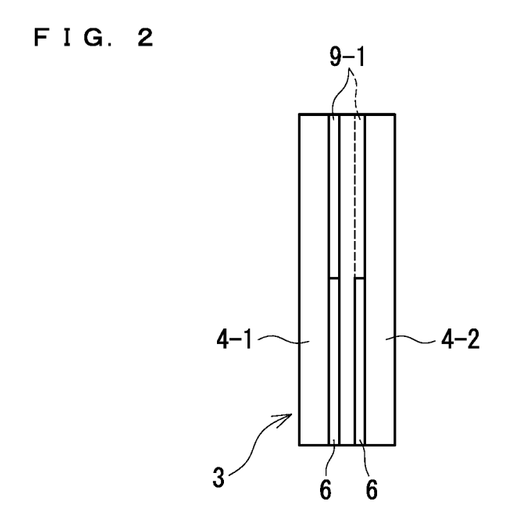
FIG. 2 is a cross section illustrating an alternate example in which a phase shift layer 9 of ($\lambda/2$) is formed in the liquid crystal element 3.

Such modification may be done as illustrated in FIG. 2 that a phase shifting layer 9-1 is formed between the transparent substrates 4-1 and 4-2, in place of the phase shift plate 9 outside the transparent substrates 4. As is illustrated in FIG. 2, a phase shifting layer 9-1 forming a phase shift of half wavelength (λ/2) is disposed on one of the transparent substrates 4-1, 4-2 in the no-electrode region. This phase shifting layer 9-1 gives similar effect as the phase shift plate 9 in the structure of FIG. 1A.

The phase shift has the module 2π, the phase shift produced by the phase shifter 9 may be (2n−1)·(λ/2), where n is a natural number.

Figure 3A:
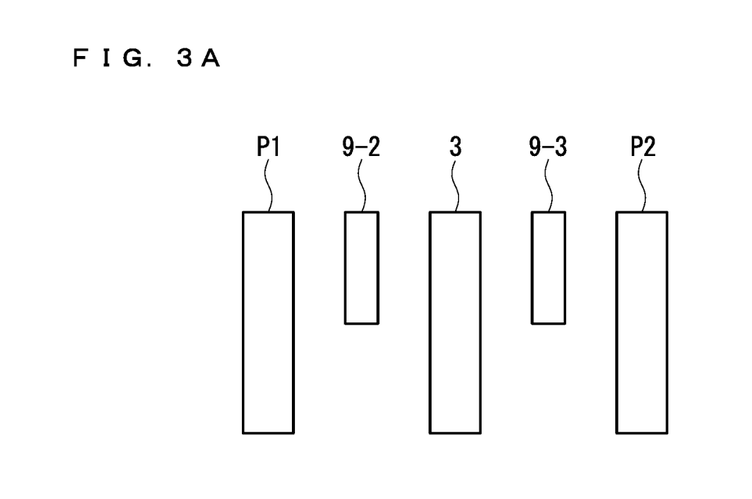
FIG. 3A is a cross section illustrating second embodiment in which two phase shift plates 9-2 and 9-3 of ($\lambda/4$) are used in place of one ($\lambda/2$) phase shift plate.

FIG. 3A illustrates second embodiment. In place of the λ/2 phase shift plate 9, a pair of λ/4 phase shift plates 9-2 and 9-3 are disposed for example on the two sides of the liquid crystal element 3. The two λ/4 phase shift plates 9-2 and 9-3 jointly serve function similar to the one λ/2 phase shift plate. The exit light beam from the downstream λ/4 phase shift plate 9-3 transmits through the polarizer P2. Between the two λ/4 phase shift plates 9-2 and 9-3, the transmitting light becomes circularly polarized light.

Figure 3B:
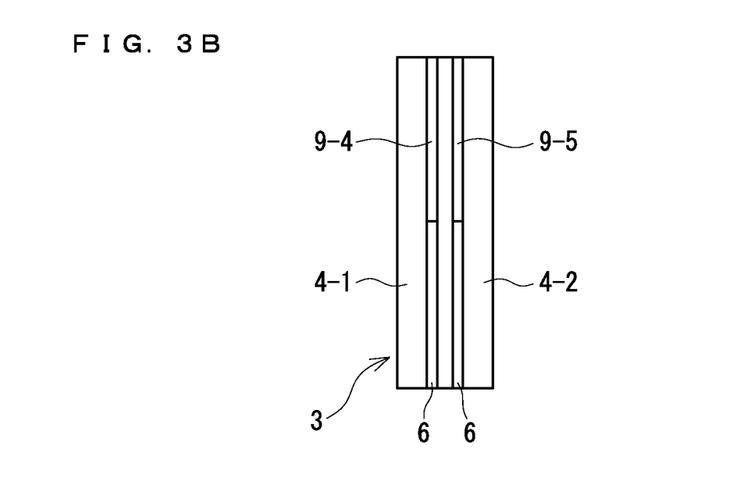
FIG. 3B is a cross section illustrating an alternate example of second embodiment in which two phase shift layers 9-4 and 9-5 of ($\lambda/4$) are formed in the liquid crystal element 3.

As illustrated in FIG. 3B, such modification of the second embodiment can be done wherein phase shift layers 9-4 and 9-5 each of quarter wavelength (λ/4) phase shift are respectively formed on no-electrode regions of the transparent substrates 4-1 and 4-2 of the liquid crystal element 3. Each of the phase shift layers 9-4 and 9-5 forms phase shift of (λ/4). The phase shift layers 9-4 and 9-5 totally give a phase shift of (λ/2). Any structure forming a phase shift, including phase shift plate and phase shift layer, may be called phase shift forming element.

Combination of three or more phase shift plates can also be used. Phase shift of λ/2 may be produced by a pair of λ/4 phase shifters, combination of one λ/3 phase shifter and one λ/6 phase shifter [(λ/3+λ/6)={(2+1) λ/6}=λ/2], and other combinations of phase shifters which totally produce a phase shift of λ/2.

Returning to FIG. 1A, lights transmitted through the analyzer P2 are upside down inversely projected by projecting optic system 10 to be projected into forwardly located field of view of the car. The liquid crystal layer 5 of the liquid crystal element 3 is located at the focal position of the projecting optic system 10. The phase shift plate 9 is preferably positioned at a location as near as the focal point. The phase shift plate 9 is preferably disposed in close contact to one of the transparent substrates 4.

In the field of view, near field NF corresponding area is formed in lower part and far field FF corresponding area is formed in upper part. The near field NF corresponding area in the lower part of the field of view is a region mainly including forward road surface, and the far field FF corresponding area in the upper part of the field of view is a region including upcoming cars and walkers.

Figure 4A:
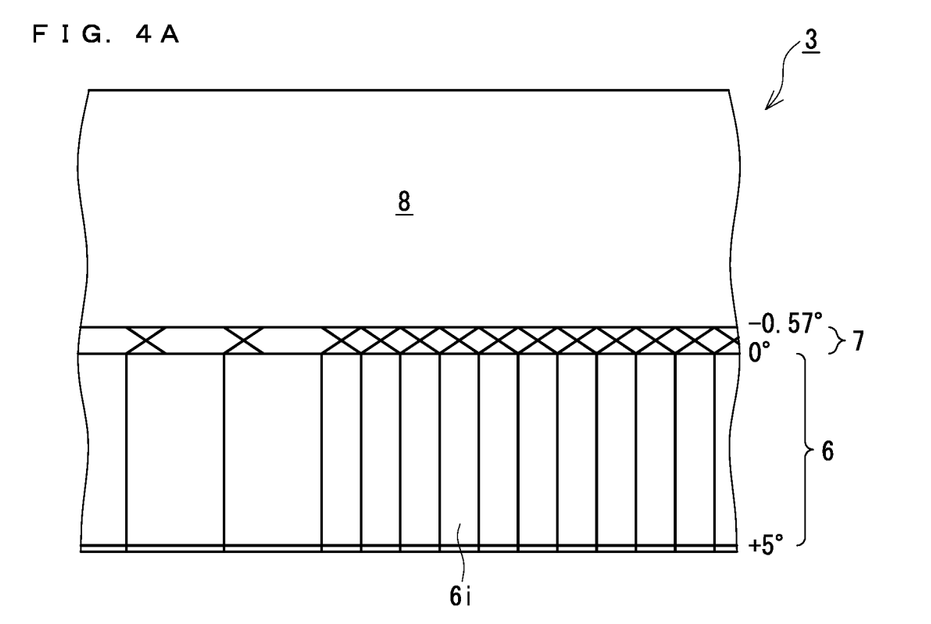
FIG. 4A is a plan view illustrating a concrete planar arrangement of a liquid crystal element 3.

FIG. 4A is a plan view illustrating a concrete planar structure of a liquid crystal element 3. The horizontal direction or positions in the field of view is depicted at 0° (degree), and upper region which will be located upper than the horizontal positions when inversely projected is the region from 0 degree to 5 degrees. In this upper region, a multiplicity of stripe shaped selection electrodes 6i elongated in the vertical direction and having limited horizontal width are arranged in horizontal direction side by side. The selection electrode 6i has such a width that enables reducing the glare light directed to the driver of an upcoming car. When one of the selection electrodes 6i is turned off, the brightness of the designated region is suppressed to suppress the glare light.

In the upper part (lower part in the field of view) of the selection electrodes 6i, swivel oriented electrodes 7 having a slanted edge of a predetermined angle are disposed in a region from 0 degree to −0.57 degrees. A selective cut-off can be formed. The swivel electrodes 7 belong to the near field area. In a region upper than −0.57 degrees, no-electrode region is disposed. Larger part of the near field area is always illuminated, to maintain fail-safe security.

Although the electrode pattern in the far field area in the structure of FIG. 4A is formed of a group of vertically long stripe electrodes, the shape of the electrode pattern is not limited to this, and can be variously altered. In the car headlight, it would be appropriate to employ surface of road as horizontal directions and vertical direction to the road surface as a reference direction.

Figure 4B:
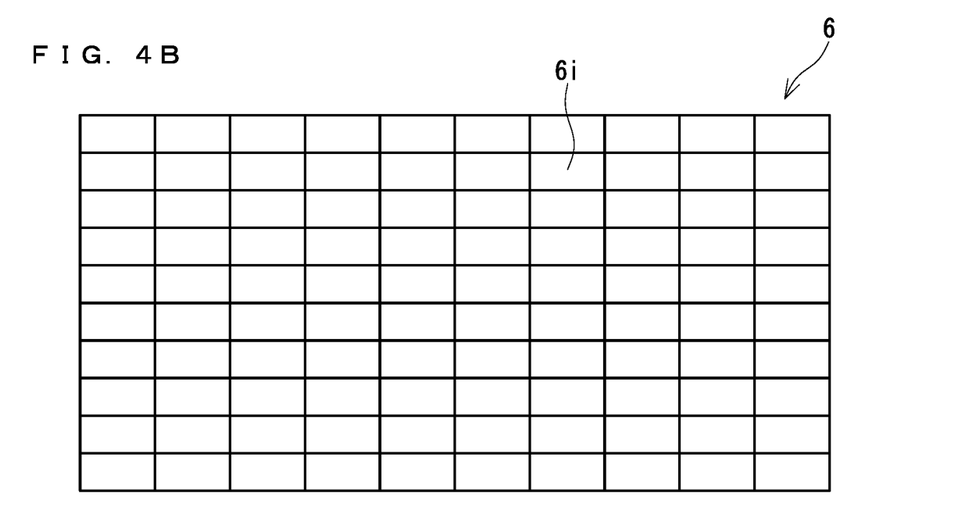
FIG. 4B is a plan view illustrating another arrangement of electrode pattern.

FIG. 4B illustrates a construction of electrode pattern 6 of matrix shape in which horizontal and vertical widths of unit electrode are limited, and unit electrodes are arranged in horizontal and vertical directions. For attaining the effect of avoiding glare light to the driver of an upcoming car, the vertical width of one electrode pattern 6i may be narrow. Disposing bright regions in the upper and the lower sides of a brightness reduced region will afford sufficiently bright field of view for the driver.

Figure 5A:
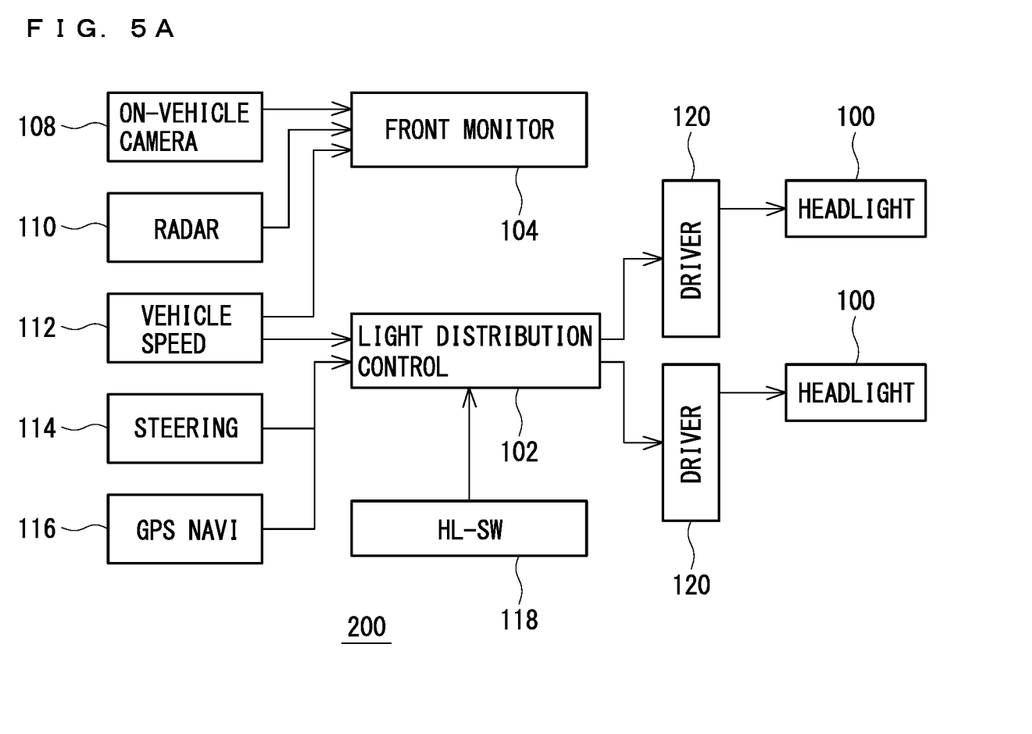
FIG. 5A is a block diagram of a car headlight system.

FIG. 5A is a block diagram illustrating a schematic structure of headlight system. A headlight system 200 comprises a pair of (left and right) automotive headlights 100, a light distribution control unit 102, a front monitoring unit 104 and so forth. The automotive headlight 100 comprises a light source formed of matrix LEDs, a projection lens, and a housing which houses these elements.

The front monitoring unit 104 connected with the on-vehicle camera 108, a radar 110, a vehicle speed sensor 112, and so forth, performs image processing on the image data obtained from these sensors, to detect vehicles in front (up-coming cars and forerunning cars), other bright objects on the road and lane marks, and thereby calculates data, such as their attributes and positions, required for the light distribution control. The calculated data is transmitted to the light distribution control unit 102 and various on-vehicles units via an in-vehicle LAN and the like.

The light distribution control unit 102, which is connected to the vehicle speed sensor 112, the steering angle sensor 114, the GPS navigation 116, high beam/low beam switch 118 etc., determines light distribution pattern associated with the travelling scene and/or condition based on the attributes (up-coming cars, forerunning cars, reflector, or road illumination) of the bright objects on the road, their positions (frontward and lateral) and the running speed sent from the front monitoring unit 104. The light distribution control unit 102 determines control amounts of a variable light distribution type headlight required for realizing the light distribution.

The light distribution control unit 102 determines the brightness adjusting control contents to be done by the liquid crystal element on the illumination lights emitted from LEDs. The driver circuits 120 convert the information on the control amounts supplied from the light distribution unit 102 into orders adapted to the actions of the driver and the light distribution control elements, and controls them.

Figure 5B:
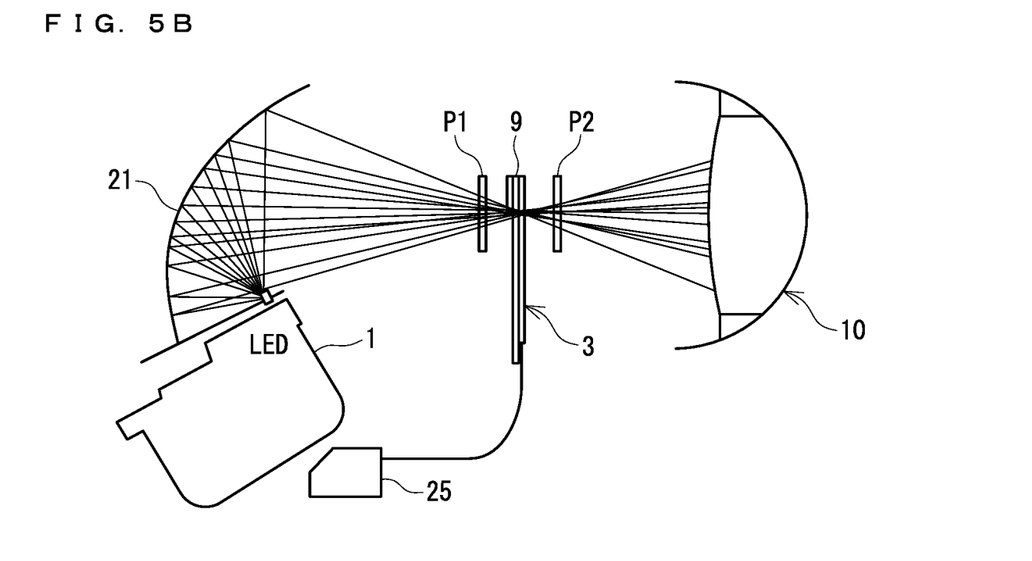
FIG. 5B is a cross section illustrating a structural example of lighting device corresponding to car headlight.

FIG. 5B is a cross section illustrating a structural example of a lighting device corresponding to the headlight 100. Lights emitted from a light source 1 such as LEDs are reflected by a reflector 21, and then are condensed on a liquid crystal element 3 partially provided with a phase shift plate 9. Polarizers P1, P2 are respectively disposed in front and at rear of liquid crystal element 3. The lights transmitted through the liquid crystal element 3 then propagate to a lens of a projecting optic system 10, while diverging again. The lights transmitted through the lens 10 are projected forward. Design is so made that the electrode pattern of the liquid crystal element is located on the focal plane of the lens. Terminal portion connected to the electrode pattern of the liquid crystal element 3 is connected to a control circuit 25 including light distribution control unit and drive circuit. Here, in place of the reflector, a lens optical system may be used.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to showing of the superiority and inferiority of the invention. It should be understood that various changes, substitutions, and alterations could be made hereto without departing from the spirit and scope of the invention.

Although description has been made on preferred embodiments, these descriptions are not restrictive. For example, exemplified shape and combination are only examples and are not restrictive. It will be apparent to those skilled in the art that various changes, modification, substitutions, improvements etc. are possible within the scope of appended claims.

What are claimed are:

1. A lighting device comprising:
    a light source for emitting illumination light along an optic axis toward field of view including a far field region at an upper part and a near field region at a lower part with respect to vertical direction;
    a liquid crystal element disposed at a position along the optic axis, having electrode pattern in a first region corresponding to the far field region and having no electrode pattern in a second region corresponding to the near field region;
    a pair of polarizers including an input side polarizer which is configured to form a linearly polarized light from a non-polarized incident light beam, the input side polarizer disposed on light source side of the liquid crystal element, and an output side polarizer disposed on field of view side of the liquid crystal element, and constituting crossed Nicol polarizers;
    a driver circuit for forming voltages to be applied to the electrode pattern; and
    phase shift forming element disposed between the pair of polarizers in correspondence to the second region of the liquid crystal element;
    wherein the first region of the liquid crystal element constitutes normally off optic system together with the pair of polarizers, and the second region of the liquid crystal element constitutes normally-on optic system together with the phase shift forming element and the pair of polarizers.

2. The lighting device according to claim 1, further comprising:
    projecting optic system disposed on field of view side of the output side polarizer, and distributing lights from the light source toward the far field region and the near field region of field of view.

3. The lighting device according to claim 2, wherein the projecting optic system constitutes optic system of car headlight.

4. The lighting device according to claim 3, wherein the liquid crystal element has electrode capable of forming cut-off region in the second region adjacent to the first region.

5. The lighting device according to claim 3, wherein the phase shift forming element gives a phase shift of $(2n-1)\cdot(\lambda/2)$ where n is a natural number, depending on in-plane directions of the liquid crystal element.

6. The lighting device according to claim 5, wherein the phase shift forming element is in close contact with or in optically merged into the liquid crystal element.

7. The lighting device according to claim 5, wherein the phase shift forming element is constituted of one $(2n-1)\cdot(\lambda/2)$ phase shift forming element, or two or more phase shift forming elements which produces a total phase shift of $(\lambda/2)$.

8. The lighting device according to claim 2, wherein the projecting optic system has a focal plane disposed on the liquid crystal element.

9. The lighting device according to claim 8, wherein the projecting optic system includes a lens.

10. The lighting device according to claim 2, wherein the electrode pattern includes a plurality of electrodes aligned along horizontal direction.

11. The lighting device according to claim 10, wherein the electrode pattern also includes a plurality of electrodes aligned along vertical direction.

* * * * *